Patented June 30, 1953

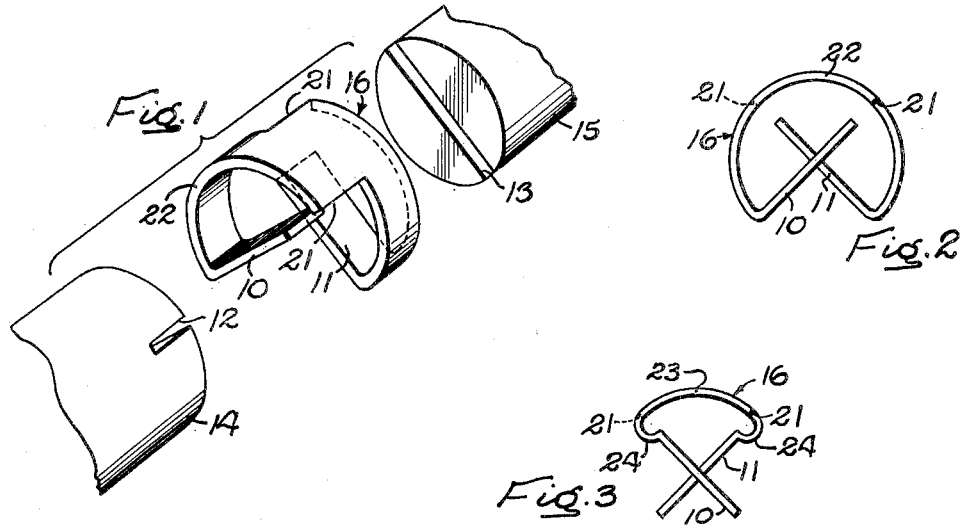
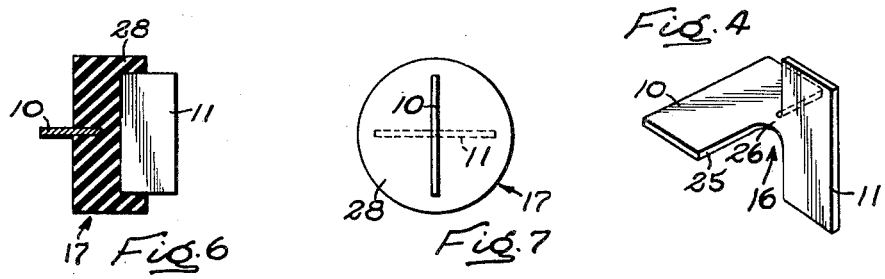
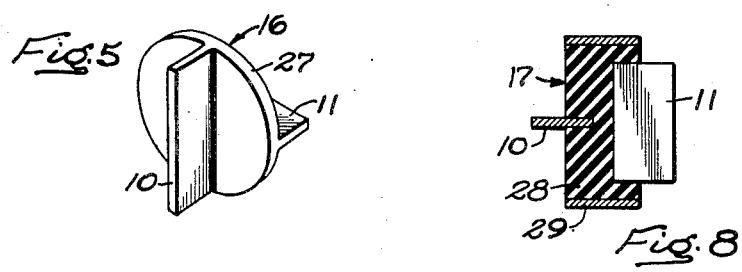
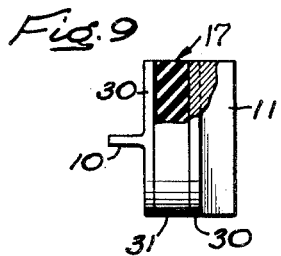

2,643,528

UNITED STATES PATENT OFFICE 2,643,528

UNIVERSAL COUPLING

Robert W. Hammarbach, Fostoria, Ohio

Application March 13, 1946, Serial No. 654,113

7 Claims. (Cl. 64—15)

The invention relates to couplings for shafts and similar rotatable elements and more particularly to a universal coupling suitable for interconnecting shafts whether or not their axes are in the same straight line.

One object of the invention is to provide an improved coupling of the above general character which is simple and rugged in construction, easy to install, inexpensive to manufacture, yet efficient and reliable in operation.

Another object is to provide a universal coupling for connecting driving and driven shafts which may be readily constructed to provide any desired degree of resiliency in the connection between the shafts.

Still another object is to provide a novel shaft coupling which requires only the slotting of the ends of the shafts to accommodate the coupling.

A further object is to provide an improved universal coupling which when assembled with a pair of shafts is automatically maintained in assembled relation therewith without the use of retaining rings, setscrews or other separable elements.

Other objects and advantages of the invention will become apparent from the following detailed description of the preferred embodiments illustrated in the accompanying drawing in which:

Figure 1 is a perspective view showing the manner in which a universal coupling embodying the features of the invention is assembled with a pair of shafts.

Fig. 2 is an end view of the coupling shown in Fig. 1.

Fig. 3 is an end view of a coupling of the general type shown in Fig. 1 constructed to provide a slightly less resilient connection.

Fig. 4 is a perspective view of the improved coupling as constructed to further reduce the resilience of the connection.

Fig. 5 is a perspective view of a modified form of coupling adapted to be formed in one piece by a simple machining operation.

Fig. 6 is a sectional view of another modified form of the coupling.

Fig. 7 is an end view of the coupling shown in Fig. 6.

Fig. 8 is a sectional view of a coupling generally similar to that shown in Fig. 6 but provided with means for increasing its strength and rigidity.

Fig. 9 is a partly sectioned side view of a coupling utilizing a composite type of construction.

While the invention is susceptible of various modifications and alternative constructions, I have shown in the drawing and will herein describe in detail several embodiments, but it is to be understood that I do not thereby intend to limit the invention to the specific forms disclosed, but intend to cover all modifications and alternative constructions falling within the spirit and scope of the invention as expressed in the appended claims.

In accordance with the invention the improved universal coupling is characterized by the provision of two interconnected oppositely facing shaft engaging elements 10 and 11 in the form of relatively thin flat tangs arranged in edge to edge relation and positioned to engage respectively in transverse slots 12 and 13 formed in the adjacent ends of shafts 14 and 15 to be coupled together. When the tangs are so engaged, the coupling is effective to transmit torque from one shaft to the other although it will be appreciated that the coupling is not intended to hold the shafts against endwise movement. To provide for automatically maintaining the coupling in assembled relation with the shafts when the latter are in their normal operating positions, the tangs 10 and 11 are arranged in crossed relation, that is, the tangs are disposed in planes which intersect each other at an angle substantially at the central axis of the coupling. As the tangs are freely slidable in the slots 12 and 13, the coupling is enabled to accommodate itself to misalignment of the shafts while the relative positioning of the tangs with respect to each other effectually limits such relative movement and effectually prevents disengagement of the coupling from the shafts. Thus the coupling is maintained in assembled relation with the shafts without the use of retaining rings, setscrews or other separable retaining devices.

The tangs 10 and 11 may be interconnected in various ways to provide any desired degree of resiliency in the coupling. Thus as shown in Figs. 1–5 the tangs may be formed integrally with a connecting member 16 or a separately formed connecting member 17 may be utilized for effecting the connection as shown in Figs. 6–9. In any case the shape or other characteristics of the connecting member determines the extent to which the tangs may be twisted relative to each other about the axis of the coupling without permanent deformation and thus controls the resilience of the connection provided by the coupling.

The particular couplings shown in Figs. 1–4 of the drawings are adapted to be constructed from suitable sheet material, preferably sheet metal at very low cost by simple stamping and bending operations. Referring to Fig. 1, the coupling there shown is formed from an elongated generally rectangular strip of sheet metal having the side edges cut away or notched as at 21 adjacent opposite ends to form laterally offset end portions constituting the tangs 10 and 11. The end portions when so formed are connected by an intermediate portion 22. This intermediate portion or connecting member is dimensioned longitudinally so that when it is bent on a radius slightly larger than that of the shaft with which the coupling is to be used, it extends through an arc of approximately 270°. The end portions or tangs 10 and 11 are then bent inwardly to cross each other substantially at the central axis of the coupling.

It will be evident that when the coupling is assembled with two shafts in the manner above described, the torque produced by the rotation of one shaft is transmitted through the tang engaging that shaft and through the connecting member 22 and companion tang to the other shaft. Due to the length of the connecting member and its arcuate form, a substantial degree of resilience is afforded by the coupling. Moreover as the tangs are freely slidable in the slots in the shafts, the coupling is enabled to accommodate itself readily to any lateral or angular misalinement of the shafts.

The coupling shown in Fig. 3 is constructed similarly to that above described except that the intermediate portion 23 forming the connecting member for the tangs is substantially shorter than the member 22. In the particular form shown, the length of the connecting portion 23 is such that it extends through an arc of approximately 90° when bent on an appropriate radius. The degree of resiliency afforded by the short connecting member is substantially less than that provided by the longer member. Additional resiliency may be provided by forming the tangs 10 and 11 with arcuate offset beads 24 closely adjacent their junction with the intermediate portion 23 of the coupling.

Fig. 4 shows a form of coupling adapted to be made from a substantially square piece of sheet material. Notches 25 cut in opposite side edges of the piece form the two tangs 10 and 11 with a narrow central strip 26 connecting them together in edge to edge relation. To complete the coupling, the tangs are twisted relative to each other about the axis of the connecting strip 26 so as to locate them in planes which intersect at the axis of the connecting strip 26 and locate the tangs at an angle effective to provide the self-retaining action above referred to. In the exemplary coupling, the tangs are disposed in substantially perpendicular planes. The connection provided by this form of coupling is relatively rigid depending upon the resiliency of the connecting strip 26 which in turn is determined by the thickness and the width of the strip. The resiliency of the strip of course varies according to the particular material from which the coupling is made.

The improved universal coupling may be constructed from material other than sheet material if desired, as indicated by the forms shown in Figs. 5–9 of the drawings. The coupling shown in Fig. 5 is particularly suitable for production by simple machining operations such as milling. Thus the coupling may be formed from a metal block 27 by milling out or notching each end of the block on opposite sides of its central axis so as to leave two diametrically disposed relatively thin ribs to form the tangs 10 and 11. The unnotched portion of the block 27 forms the body of the coupling and rigidly connects the two tangs. It will be understood of course that the notches are cut so that the tangs 10 and 11 are disposed in angularly related planes intersecting at the axis of the coupling. Couplings formed in this manner provide a relatively rigid connection between the shafts with which they are associated.

Referring to Figs. 6 and 7 of the drawings the body 7 of the coupling comprises a cylindrical block 28 of rubber or other suitable resilient material and the tangs 10 and 11 are embedded therein so as to project from opposite ends. The tangs in this instance are separately formed and comprise relatively thin flat strips of metal or other suitable material. The self-retaining characteristics of the improved coupling are attained by locating the tangs in crossed relation as shown.

To provide increased strength and rigidity in couplings of the type shown in Fig. 7, the block 28 may be encased in a metal band 29 as shown in Fig. 8. Preferably the band is cemented to the block so as to provide a firm nonslipping connection therewith. The band is thus enabled to limit the degree of distortion of the block 28 by the forces exerted on the tangs.

In the composite coupling shown in Fig. 9 the tang carrying portions may be formed either by stamping or machining operations. The coupling comprises a pair of metal end members each consisting of a disk-shaped base 30 having a rib extending transversely across and projecting outwardly from its front face. The members are assembled in back to back relation and secured together by a cylindrical block 31 of rubber or other suitable material cemented to the rear faces of the bases 30. In assembling the parts, the projecting ribs are positioned in crossed relation to form the tangs 10 and 11 of the coupling and function in the manner heretofore described.

It will be apparent from the foregoing that the invention provides a universal coupling of novel and advantageous construction. The coupling is extremely simple and capable of being manufactured at very low cost. Moreover it is rugged, foolproof and efficient and reliable in operation. Due to the novel relationship of the shaft engaging elements the coupling is automatically maintained in assembled relation with the shafts with which it is associated without requiring the use of setscrews or other separable retaining means.

I claim as my invention:

1. A universal torque transmitting coupling comprising an elongated strip of sheet material having end portions of substantial width offset oppositely from the intermediate portion, said intermediate portion being bent through an arc of approximately two hundred seventy degrees and said end portions being bent inwardly so as to lie crosswise of each other at right angles and in edge to edge relation.

2. A universal coupling comprising an elongated strip of sheet material having end portions offset oppositely from the intermediate portion, said intermediate portion being bent through an arc of approximately ninety degrees and said end portions being bent inwardly to lie crosswise of each other in edge to edge relation.

3. A universal torque transmitting coupling for drivingly connecting two shafts arranged in end-to-end relation, said coupling comprising a pair of thin flat tangs of substantial width axially of the coupling adapted to engage in transverse slots in the adjacent ends of the two shafts, said tangs being disposed in edge to edge relation and crosswise at a predetermined angle to each other, and a resilient member connecting said tangs, said member comprising an arcuately bent metal strip extending from the end of one tang around the peripheral surfaces of the shafts to the next adjacent end of the other tang.

4. A universal torque transmitting coupling for drivingly connecting two shafts arranged in end-to-end relation, said coupling comprising a pair of thin flat tangs of substantial width axially of the coupling adapted to engage in transverse slots in the adjacent ends of the two shafts, said tangs being disposed in edge to edge relation and crosswise at a predetermined angle to each other, and a resilient member connecting said tangs, said member comprising an arcuately bent metal strip extending through an arc of approximately two hundred seventy degrees and having portions overlying the peripheral surfaces of the shafts.

5. A torque transmitting coupling comprising an elongated thin metal strip of substantial width having the side edges cut away at opposite ends to form laterally offset end portions and a wide intermediate connecting portion, said intermediate portion being arcuately formed and said end portions being turned inwardly so as to extend crosswise of each other in edge to edge relation.

6. A universal torque transmitting coupling for drivingly connecting two shafts arranged in end-to-end relation, said coupling comprising a pair of thin flat tangs of substantial width adapted to slidably engage in transverse slots in the adjacent ends of the two shafts, said tangs being located closely adjacent in edge to edge relation and crossing each other at right angles substantially on the common axis of the shafts, and a resilient element integral with and connecting said tangs.

7. A universal torque transmitting coupling for drivingly connecting two shafts arranged in end-to-end relation, said coupling comprising a pair of thin flat tangs of substantial width adapted to slidably engage in transverse slots in the adjacent ends of the two shafts, said tangs being located closely adjacent in edge to edge relation and crossing each other at right angles substantially on the common axis of the shafts, and a flexible strip operatively connecting the outer end of one tang with the corresponding end of the other tang.

ROBERT W. HAMMARBACH.

References Cited in the file of this patent

UNITED STATES PATENTS

| Number | Name | Date |
|---|---|---|
| 833,153 | Blakeslee | Oct. 16, 1906 |
| 839,803 | Amsler | Jan. 1, 1907 |
| 1,072,622 | Koechlin | Sept. 9, 1913 |
| 1,244,533 | Morse | Oct. 30, 1917 |
| 1,346,867 | Weibull | July 20, 1920 |
| 1,349,329 | Dispot | Aug. 10, 1920 |
| 1,525,026 | Dickerman | Feb. 3, 1925 |
| 1,769,107 | Brown | July 1, 1930 |
| 1,943,942 | Quintavalle | Jan. 16, 1934 |
| 2,046,087 | Pountnay | June 20, 1936 |